United States Patent
Hardee et al.

(10) Patent No.: US 10,831,635 B2
(45) Date of Patent: Nov. 10, 2020

(54) PREEMPTION OF FALSE POSITIVES IN CODE SCANNING

(71) Applicant: INTERNATIONAL BUSINESS MACHINES CORPORATION, Armonk, NY (US)

(72) Inventors: Christopher J. Hardee, Raleigh, NC (US); Steven R. Joroff, Tokyo (JP); Pamela A. Nesbitt, Ridgefield, CT (US); Scott E. Schneider, Rolesville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 141 days.

(21) Appl. No.: 15/335,617

(22) Filed: Oct. 27, 2016

(65) Prior Publication Data

US 2018/0121314 A1 May 3, 2018

(51) Int. Cl.
*G06F 8/75* (2018.01)
*G06F 8/70* (2018.01)
*G06F 11/36* (2006.01)
*G06F 8/41* (2018.01)

(52) U.S. Cl.
CPC ............ *G06F 11/3604* (2013.01); *G06F 8/43* (2013.01); *G06F 8/75* (2013.01); *G06F 8/70* (2013.01)

(58) Field of Classification Search
CPC .......... G06F 11/3604; G06F 8/43; G06F 8/75
USPC ......................................... 717/110–112, 124
See application file for complete search history.

(56) References Cited

U.S. PATENT DOCUMENTS

| 6,237,136 | B1 * | 5/2001 | Sadahiro | G06F 8/10 717/110 |
| 7,089,581 | B1 * | 8/2006 | Nagai | G06Q 99/00 713/166 |
| 7,614,044 | B2 * | 11/2009 | Bhansali | G06F 8/44 717/124 |
| 7,711,660 | B1 * | 5/2010 | Gentile | G06Q 50/22 705/2 |
| 7,904,807 | B2 * | 3/2011 | Bell | G06F 16/972 715/249 |
| 8,108,315 | B2 | 1/2012 | Krawetz | |
| 8,359,655 | B1 * | 1/2013 | Pham | G06F 21/12 726/26 |
| 8,479,161 | B2 | 7/2013 | Weigert | |
| 8,521,652 | B2 | 8/2013 | Foster | |
| 8,539,282 | B1 * | 9/2013 | Kabanov | G06F 11/3688 702/182 |
| 8,640,101 | B2 | 1/2014 | Spurlin | |
| 8,806,441 | B2 | 8/2014 | Chandra et al. | |

(Continued)

OTHER PUBLICATIONS

Mathur et al., "An Empirical Study of License Violations in Open Source Projects," 2012 IEEE 35th Software Engineering Workshop, 2013 (9 pages).

(Continued)

*Primary Examiner* — Jason D Mitchell
(74) *Attorney, Agent, or Firm* — Griffiths & Seaton PLLC (57) ABSTRACT

Embodiments for reducing false matches in a code analysis by one or more processors. Source code is scanned against a stored formatting profile. If a match between at least a portion of the source code and the formatting profile is found, restriction is made from incorporating the at least the portion of the source code in source code development.

12 Claims, 5 Drawing Sheets

(56) References Cited

U.S. PATENT DOCUMENTS

| | | |
|---|---|---|
| 8,881,122 B1 | 11/2014 | Klimek et al. |
| 8,910,117 B2 | 12/2014 | Li et al. |
| 8,935,801 B1 | 1/2015 | Pham |
| 9,104,878 B1 | 8/2015 | Khairetdinov |
| 9,177,123 B1 | 11/2015 | Farquhar |
| 9,275,232 B2 | 3/2016 | Bhattacharya |
| 9,396,237 B1* | 7/2016 | Shah ..................... G06Q 10/10 |
| 2005/0081107 A1* | 4/2005 | DeWitt, Jr. ......... G06F 11/3466 |
| | | 714/38.13 |
| 2005/0132334 A1* | 6/2005 | Busfield ............. G06F 9/44505 |
| | | 717/124 |
| 2006/0059061 A1* | 3/2006 | Oey ....................... G06Q 10/10 |
| | | 705/35 |
| 2006/0101406 A1* | 5/2006 | Goenka .............. G06F 11/3664 |
| | | 717/124 |
| 2008/0072217 A1* | 3/2008 | Li ............................ G06F 8/71 |
| | | 717/170 |
| 2008/0320455 A1* | 12/2008 | Spurlin ..................... G06F 8/36 |
| | | 717/143 |
| 2009/0132666 A1* | 5/2009 | Rahman .............. H04L 41/0681 |
| | | 709/206 |
| 2009/0210855 A1* | 8/2009 | Ramanathan ............. G06F 8/36 |
| | | 717/102 |
| 2010/0050155 A1* | 2/2010 | Iwama ................ G06F 11/3604 |
| | | 717/120 |
| 2010/0058291 A1* | 3/2010 | Hahn .................... G06F 11/302 |
| | | 717/113 |
| 2010/0241469 A1* | 9/2010 | Weigert .............. G06F 11/3604 |
| | | 717/124 |
| 2011/0225589 A1* | 9/2011 | Pirog .................... G06F 9/3851 |
| | | 718/102 |
| 2012/0109869 A1* | 5/2012 | Sahibzada ............. G06F 17/289 |
| | | 706/47 |
| 2012/0110142 A1* | 5/2012 | Montagna ........... H04L 41/0853 |
| | | 709/220 |
| 2013/0006730 A1* | 1/2013 | Secretan ................ G06Q 30/02 |
| | | 705/14.4 |
| 2013/0024848 A1* | 1/2013 | Bhaskaracharya ..... G06F 8/443 |
| | | 717/147 |
| 2013/0074038 A1* | 3/2013 | Fox ........................... G06F 8/70 |
| | | 717/122 |
| 2013/0097223 A1* | 4/2013 | Mishkevich ........ G06F 11/3006 |
| | | 709/203 |
| 2014/0173552 A1* | 6/2014 | Beale .................. G06F 11/3604 |
| | | 717/106 |
| 2014/0195659 A1* | 7/2014 | Jaroch ................... G06F 9/4843 |
| | | 709/223 |
| 2014/0201702 A1* | 7/2014 | Kaplinger ................. G06F 8/76 |
| | | 717/101 |
| 2015/0106793 A1* | 4/2015 | Kahne ................ G06F 11/3648 |
| | | 717/130 |
| 2015/0186648 A1 | 7/2015 | Lakhotia |
| 2019/0392329 A1* | 12/2019 | Rangarajan ............... G06F 8/74 |
| 2020/0104235 A1* | 4/2020 | Mathur ..................... G06F 8/75 |

OTHER PUBLICATIONS

IBM, "Unacceptable Source Code License Alert System," An IP.com Prior Art Database Technical Disclosure, IP.com No. IPCOM000181881D, Apr. 16, 2009 (3 pages).

Anonymous, "Systems and methods to augment integrated development environments in support of providing seamless copyright protection of source code," An IP.com Prior Art Database Technical Disclosure, IP.com No. IPCOM000220921D, Aug. 15, 2012 (10 pages).

* cited by examiner

PREEMPTION OF FALSE POSITIVES IN CODE SCANNING

BACKGROUND OF THE INVENTION

Field of the Invention

The present invention relates in general to computing systems, and more particularly to, various embodiments for preempting false positives in source code scanning.

Description of the Related Art

In today's interconnected and complex society, computers and computer-driven equipment are more commonplace. Processing devices, with the advent and further miniaturization of integrated circuits, have made it possible to be integrated into a wide variety of personal, business, health, home, education, and other devices. Accordingly, the use of computers, network appliances, and similar data processing devices continue to proliferate throughout society.

SUMMARY OF THE INVENTION

Various embodiments reducing false matches in a code analysis by one or more processors, are provided. In one embodiment, by way of example only, a method for reducing false matches in a code analysis by one or more processors is provided. Source code is scanned against a stored formatting profile. If a match between at least a portion of the source code and the formatting profile is found, restriction is made from incorporating the at least the portion of the source code in source code development.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Source code scanners are used, for among other purposes, identifying copyright violations or use of source code from other libraries. Source code scanning may also be used, for example, to identify security flaws in source code by identifying vulnerable portions of code.

While source code scanning functionality may be useful for identifying various issues in a particular portion of source code, in many cases conventional code scanning functionality will return "false positive" results, which result in the expenditure of many man hours of work for developers (along with the expenditure of other limited resources) to sort through flagged portions of code to determine which flagged portions are of legitimate concern. Accordingly, a need exists for a mechanism whereby code scanning functionality may reduce instances of false positives in scan results.

The mechanisms of the illustrated embodiments, as will be further described, introduce methodologies for the preemption, reduction, and management of source code scanning results that may be termed false positive in nature. As will be further described, a set of matching definitions may be created for a source code analysis tool that are used by the tool when searching for matches. The definitions may be converted into compiler and formatting rules, which is used to create a base formatting profile. The formatting profile may be customized for certain implementations, and as will be further described, used to uniquely identify source code, the kind of development used, and/or certain events that may have transpired during the source code development. Use of a base formatting profile for matching against source code reduces instances of false positive results, saving limited computing and human resources.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
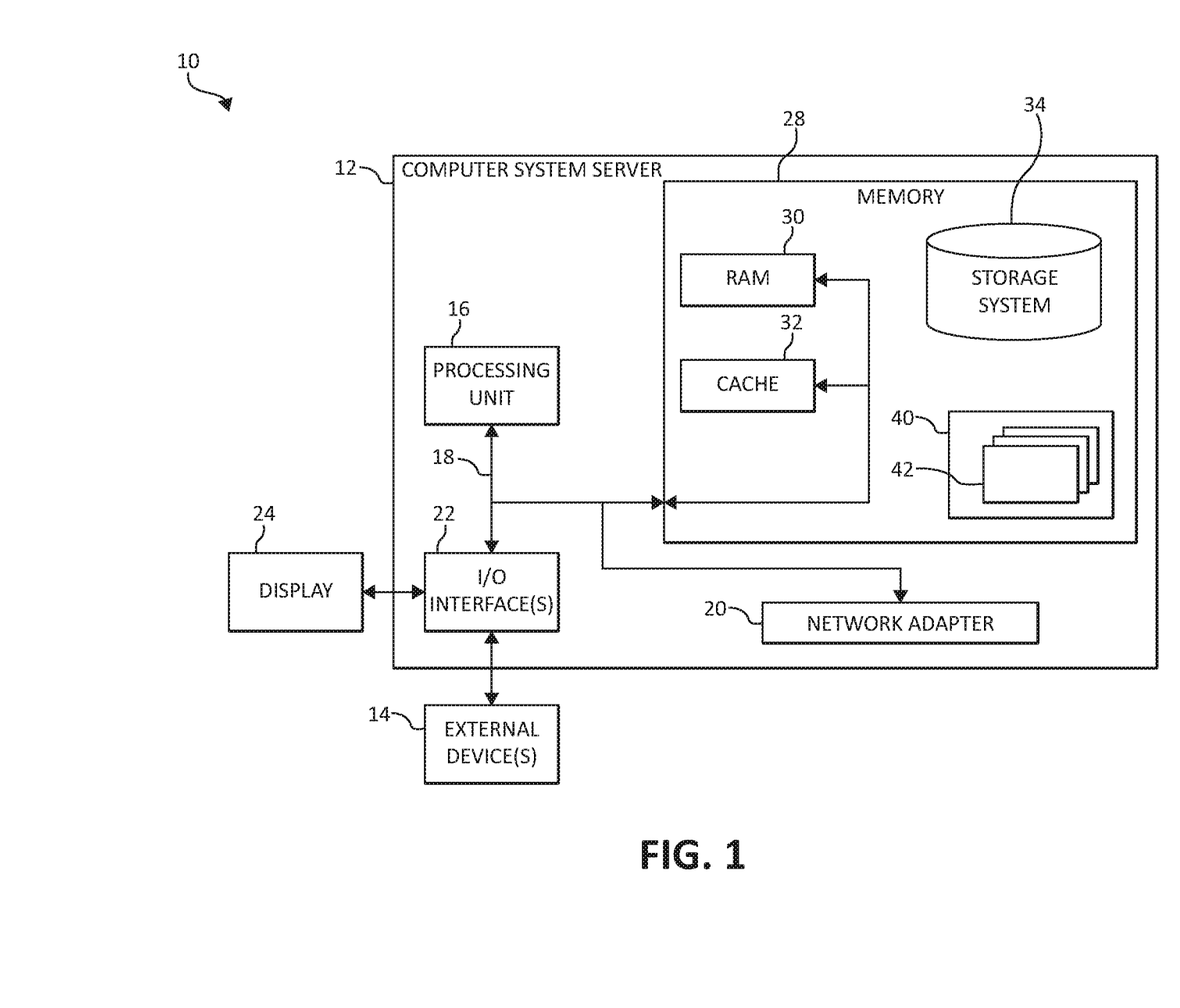
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
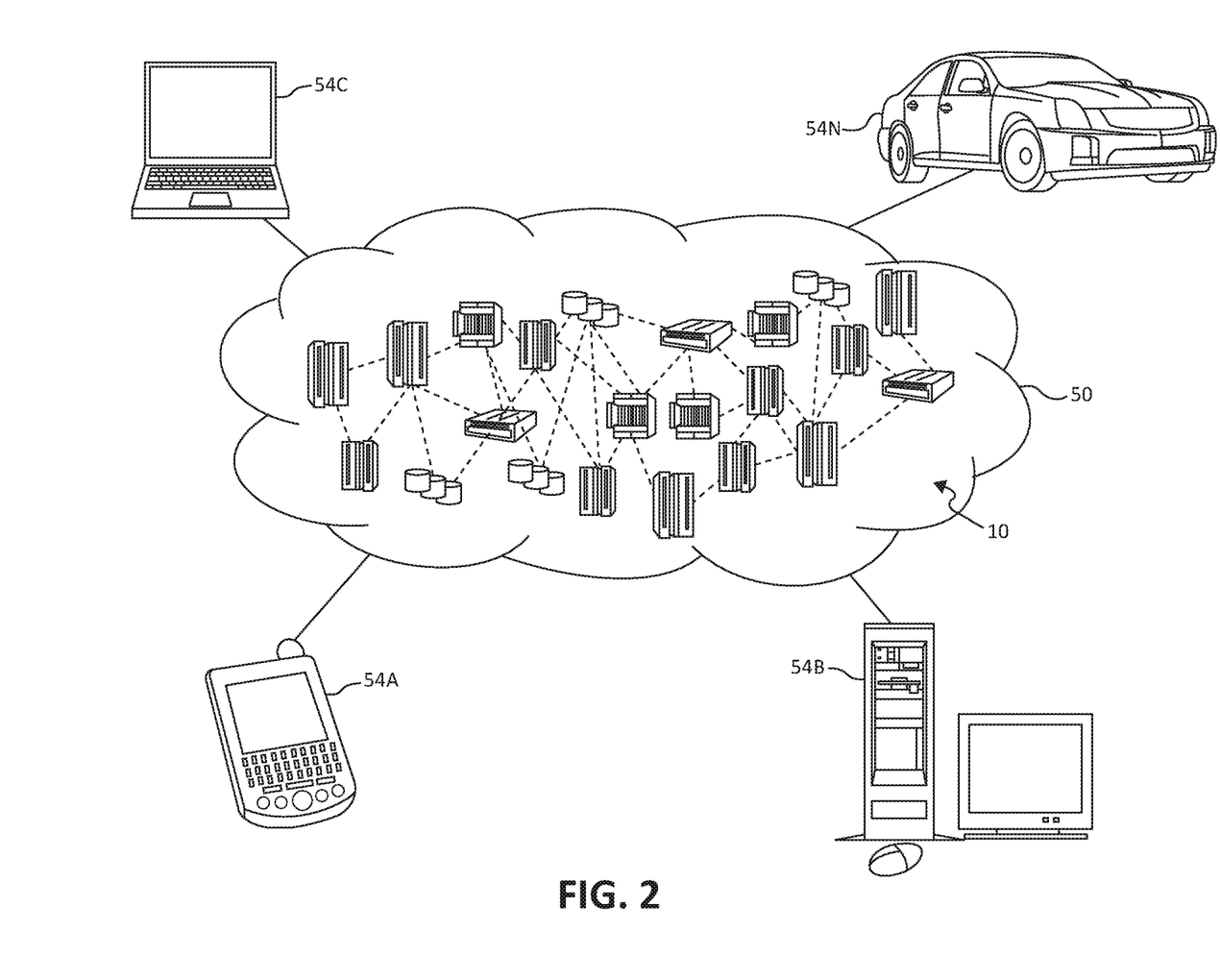
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
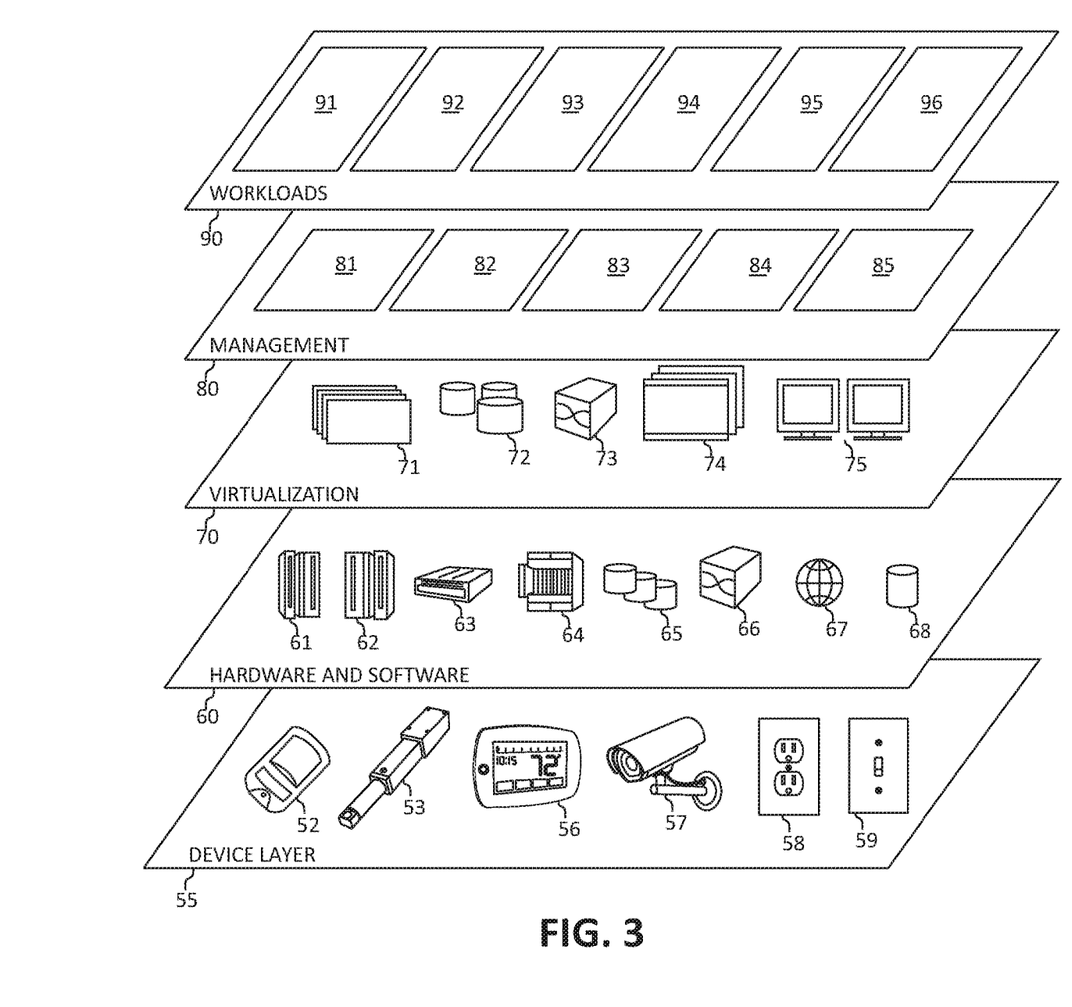
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various code scanning workloads and functions 96.

In addition, code scanning workloads and functions 96 may include such operations as formatting profile creation operations, definitions creation operations, conversion of definitions to compiler and formatting rules for Integrated Developer Environments (IDEs), identifier and notification functionality for matching strings, and other various functionality as will be further described. One of ordinary skill in the art will appreciate that the code scanning workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
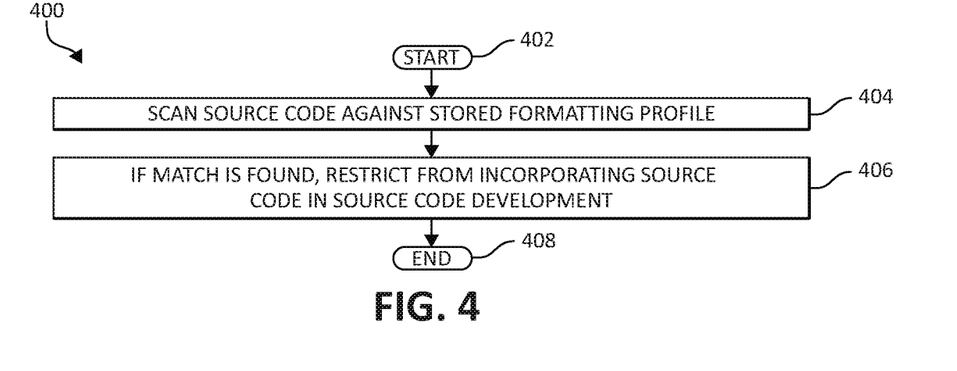
FIG. 4 is a flowchart diagram of an exemplary method for preempting false positives in code scanning, in which various aspects of the present invention may be realized.

Turning to FIG. 4, a flowchart diagram of an exemplary method 400 for preemption of false positives in code scanning is depicted, in which various aspects of the present invention may be realized. Method 400 begins (step 402) by scanning selected source code against a stored formatting profile (step 404) during a development process. If a match is found, various configurable restrictions may then be imposed on the development that limit incorporation of the source code in the source code development (step 406). The restrictions may be applied to a user, a process, an entity, a program, and the like. The method 400 then ends (step 408).

Figure 5A:
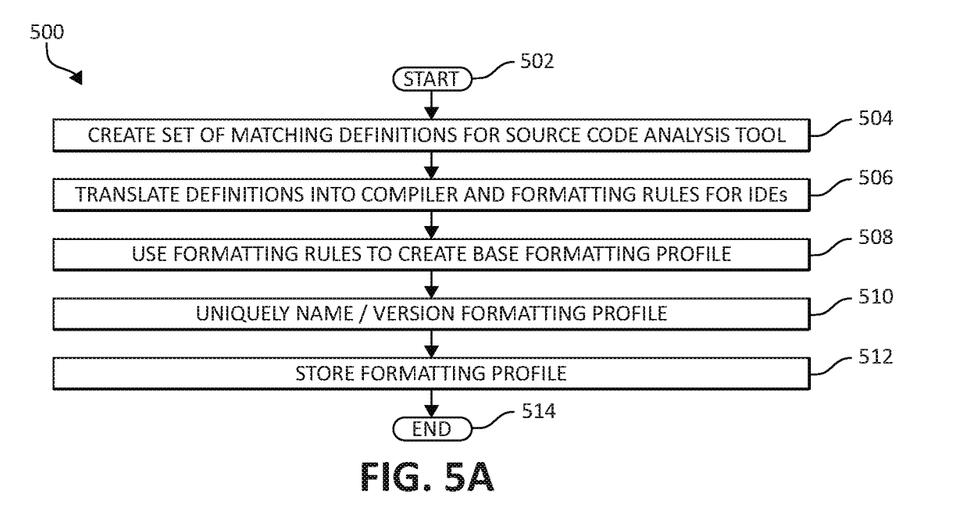
FIG. 5A is an additional flowchart diagram of an additional exemplary method for preempting false positives in code scanning, again in which various aspects of the present invention may be realized.

FIG. 5A, following, is an additional flowchart of an additional method 500 for preempting false positives in code scanning by one or more processors, here again in which various aspects of the present invention may be realized. Method 500 begins (step 502) with the creation of a set of matching definitions to be implemented in a source code analysis tool (step 504). The matching definitions may then be translated into compiler and formatting rules for IDEs (step 506).

In a following step 508, the compiler and formatting rules may be used to create a base formatting profile. The formatting profile may be associated with specific source code as will be further described. For example, the formatting profile may be uniquely named and/or versioned (step 510) so that specific source code is then affiliated with a particular base formatting profile. The formatting profile is stored (step 512). The method 500 then ends (step 514).

Figure 5B:
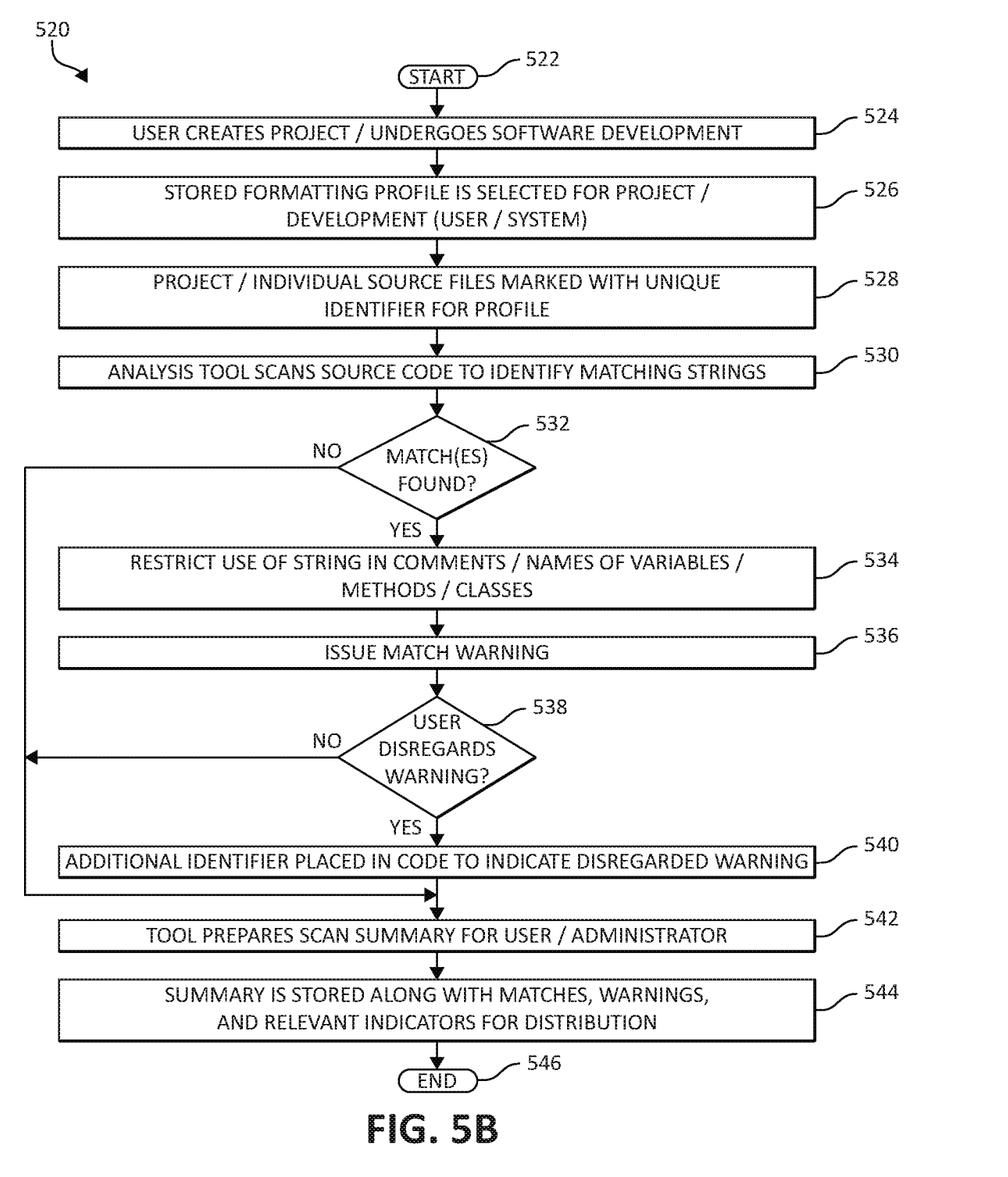
FIG. 5B is an additional flowchart diagram of an additional exemplary method for preempting false positives in code scanning, again in which various aspects of the present invention may be realized.

Turning to FIG. 5B, following, an additional flowchart of an additional method 520 is shown for preempting false positives in code scanning by one or more processors, here again in which various aspects of the present invention may be realized. Method 520 begins (step 522), as a user creates a software development project and/or otherwise undergoes software development (step 524). During the software development process, a selection process is undertaken (by the user, or by the system, or otherwise) to select an appropriate base formatting profile that corresponds to the particular project (step 526). The formatting profile may be stored as part of the project in source control, or, for example, distributed manually and then verified at build time.

Turning then to step 528, during the development process, the individual source files may be marked with a unique identifier corresponding to the selected formatting profile. The source code analysis tool then scans the source code to identify matching strings, for example (step 530). If match(es) are found (step 532), the method 520 then proceeds to step 534, which implements various restrictions of the use of the string(s) in development, such as restrictions of use in comments, names of variables, methods, and/or classes. In addition, various flags or alerts may be triggered by the match (step 536), and the developer may be notified of the match, and the match recorded by the analysis tool. If in decision step 532 matches are not found, the method 520 continues to step 542 as described following.

Use of the selected formatting profile in combination with the developed source code allows, for example, during the scanning process, the scan tool to identify which rule(s) were adhered by the developers of the particular source code. Matching code using the same rules, in one embodiment, may elevate a particular kind of warning issued by the analysis tool, based on, among other factors, that spurious occurrences should have been removed when the code was created.

In an additional example, various rules may require that an identifier is placed in the code to indicate that a warning was ignored (decision step 538, continuing to step 540), and/or optionally requiring an explanation comment to be placed in the development record. The code scan analysis tool may then flag this situation differently than other matches that were found using the code matching definitions. If in decision step 538 the user heeds the warning, the method 520 continues to step 542 as shown.

In an additional step 542, the scan analysis tool then may prepare a scan summary for the developer, user, administrator, or other IT professional. The summary may be stored along with the source code matches, warnings, and relevant indicators for later distribution in the following step 544. The method 520 then ends (step 546).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for reducing false matches in a code analysis by one or more processors, comprising:

defining a set of matching definitions for source code, the matching definitions created for a source code analysis tool and translated into a stored profile of a plurality of stored formatting profiles, the stored profile comprising compiler and formatting rules; wherein the stored formatting profile is affiliated with a specific instance of the source code such that, prior to the development of the source code, one of the plurality of stored formatting profiles is selected by a developer to correspond to the specific instance of the source code under development;

during the development of the source code, marking the source code with a first unique identifier referencing the stored formatting profile to indicate which of the plurality of stored formatting profiles is being used as a template for the source code development; wherein the first unique identifier is indicative of a set of formatting rules comprised in the stored formatting profile and followed during the source code development;

scanning the source code against the stored formatting profile by the source code analysis tool according to the matching definitions of the stored formatting profile indicated by the first unique identifier; wherein, during the scanning, rules followed by the source code analysis tool which trigger matches and warnings between the source code and the stored formatting profile are adjusted to correspond with the set of formatting rules implemented during the source code development as indicated by the first unique identifier; and wherein the stored formatting profile comprises the compiler and formatting rules associated with the specific instance of the source code, the compiler and formatting rules used to reduce false positive scan results commensurate with the scanning;

if a match between at least a portion of the source code and the formatting profile is found according to the set of formatting rules referenced by the first unique identifier, restricting incorporating the at least the portion of the source code in source code development;

marking the source code with a second unique identifier referencing an ignored restriction by the developer such that during the scanning, the marked source code is flagged to instruct the analysis tool to disregard the at least the portion of the source code which otherwise would have been restricted during the source code development according to the match being found; wherein marking the source code further includes inserting an explanation comment into a development record within the source code describing why the restriction was ignored by the developer; and presenting a scan summary, via a display, to a user indicating the resulting matches and warnings according to the scanned source code.

2. The method of claim 1, further including converting the set of matching definitions into compiler and formatting rules for an Integrated Developer Environment (IDE) tool to be used in the stored formatting profile.

3. The method of claim 1, further including, pursuant to restricting incorporating the at least the portion of the source code, preventing use of a matching string, variable, method, or class in the source code development.

4. The method of claim 1, further including uniquely naming or versioning the formatting profile.

5. A system for reducing false matches in a code analysis, comprising:
one or more processors, that:
define a set of matching definitions for source code, the matching definitions created for a source code analysis tool and translated into a stored formatting profile of a plurality of stored formatting profiles, the stored profile comprising compiler and formatting rules; wherein the stored formatting profile is affiliated with a specific instance of the source code such that, prior to the development of the source code, one of the plurality of stored formatting profiles is selected by a developer to correspond to the specific instance of the source code under development;

during the development of the source code, mark the source code with a first unique identifier referencing the stored formatting profile to indicate which of the plurality of stored formatting profiles is being used as a template for the source code development; wherein the first unique identifier is indicative of a set of formatting rules comprised in the stored formatting profile and followed during the source code development;

scan the source code against the stored formatting profile by the source code analysis tool according to the matching definitions of the stored formatting profile indicated by the first unique identifier; wherein, during the scanning, rules followed by the source code analysis tool which trigger matches and warnings between the source code and the stored formatting profile are adjusted to correspond with the set of formatting rules implemented during the source code development as indicated by the first unique identifier; and wherein the stored formatting profile comprises the compiler and formatting rules associated with the specific instance of the source code, the compiler and formatting rules used to reduce false positive scan results commensurate with the scanning, if a match between at least a portion of the source code and the formatting profile is found according to the set of formatting rules referenced by the first unique identifier, restrict incorporation of the at least the portion of the source code in source code development, mark the source code with a second unique identifier referencing an ignored restriction by the developer such that during the scanning, the marked source code is flagged to instruct the analysis tool to disregard the at least the portion of the source code which otherwise would have been restricted during the source code development according to the match being found; wherein marking the source code further includes inserting an explanation comment into a development record within the source code describing why the restriction was ignored by the developer, and present a scan summary, via a display, to a user indicating the resulting matches and warnings according to the scanned source code.

6. The system of claim 5, wherein the one or more processors convert the set of matching definitions into compiler and formatting rules for an Integrated Developer Environment (IDE) tool to be used in the stored formatting profile.

7. The system of claim 5, wherein the one or more processors, pursuant to restricting incorporation of the at least the portion of the source code, prevent use of a matching string, variable, method, or class in the source code development.

8. The system of claim 5, wherein the one or more processors uniquely name or version the formatting profile.

9. A computer program product for reducing false matches in a code analysis by one or more processors, the computer program product comprising a non-transitory computer-readable storage medium having computer-readable program code portions stored therein, the computer-readable program code portions comprising:
an executable portion that defines a set of matching definitions for source code, the matching definitions created for a source code analysis tool and translated into a stored formatting profile of a plurality of stored formatting profiles, the stored profile comprising compiler and formatting rules; wherein the stored formatting profile is affiliated with a specific instance of the source code such that, prior to the development of the source code, one of the plurality of stored formatting profiles is selected by a developer to correspond to the specific instance of the source code under development;

an executable portion that during the development of the source code, marks the source code with a first unique identifier referencing the stored formatting profile to indicate which of the plurality of stored formatting profiles is being used as a template for the source code development; wherein the first unique identifier is indicative of a set of formatting rules comprised in the stored formatting profile and followed during the source code development;

an executable portion that scans the source code against the stored formatting profile by the source code analysis tool according to the matching definitions of the stored formatting profile indicated by the first unique identifier; wherein, during the scanning, rules followed by the source code analysis tool which trigger matches and warnings between the source code and the stored formatting profile are adjusted to correspond with the set of formatting rules implemented during the source code development as indicated by the first unique identifier; and wherein the stored formatting profile comprises the compiler and formatting rules associated with the specific instance of the source code, the compiler and formatting rules used to reduce false positive scan results commensurate with the scanning;

an executable portion that, if a match between at least a portion of the source code and the formatting profile is found according to the set of formatting rules referenced by the first unique identifier, restricts incorporating the at least the portion of the source code in source code development;

an executable portion that marks the source code with a second unique identifier referencing an ignored restriction by the developer such that during the scanning, the marked source code is flagged to instruct the analysis tool to disregard the at least the portion of the source code which otherwise would have been restricted during the source code development according to the match being found; wherein marking the source code further includes inserting an explanation comment into a development record within the source code describing why the restriction was ignored by the developer; and an executable portion that presents a scan summary, via a display, to a user indicating the resulting matches and warnings according to the scanned source code.

10. The computer program product of claim 9, further including an executable portion that converts the set of matching definitions into compiler and formatting rules for an Integrated Developer Environment (IDE) tool to be used in the stored formatting profile.

11. The computer program product of claim 9, further including an executable portion that, pursuant to restricting incorporating the at least the portion of the source code, prevents use of a matching string, variable, method, or class in the source code development.

12. The computer program product of claim 9, further including an executable portion that uniquely names or versions the formatting profile.

\* \* \* \* \*